(12) United States Patent
Parekh et al.

(10) Patent No.: US 9,811,618 B1
(45) Date of Patent: Nov. 7, 2017

(54) SIMULATION OF SYSTEM DESIGNS

(71) Applicant: Xilinx, Inc., San Jose, CA (US)

(72) Inventors: Umang Parekh, San Jose, CA (US); Arvind Sundararajan, San Jose, CA (US); Sandeep Dutta, Foster City, CA (US)

(73) Assignee: XILINX, INC., San Jose, CA (US)

( * ) Notice: Subject to any disclaimer, the term of this patent is extended or adjusted under 35 U.S.C. 154(b) by 836 days.

(21) Appl. No.: 13/788,189

(22) Filed: Mar. 7, 2013

(51) Int. Cl.
*G06F 17/50* (2006.01)
*G06F 15/78* (2006.01)

(52) U.S. Cl.
CPC ...... *G06F 17/5036* (2013.01); *G06F 15/7867* (2013.01); *G06F 17/5054* (2013.01)

(58) Field of Classification Search
USPC .......................................................... 703/14
See application file for complete search history.

(56) References Cited

U.S. PATENT DOCUMENTS

| | | | | |
|---|---|---|---|---|
| 5,426,379 A * | 6/1995 | Trimberger | ............... | G06F 5/10 326/38 |
| 5,663,900 A | 9/1997 | Bhandari et al. | | |
| 5,705,938 A * | 1/1998 | Kean | ................ | H03K 19/17704 326/39 |
| 6,230,307 B1 * | 5/2001 | Davis | .................. | G06F 17/5054 326/37 |
| 6,886,092 B1 * | 4/2005 | Douglass | .............. | G06F 9/3877 326/41 |
| 7,346,481 B1 * | 3/2008 | Ballagh | ............... | G06F 17/5009 703/14 |
| 7,523,434 B1 * | 4/2009 | Taylor | ................. | G06F 17/5054 716/100 |
| 7,636,802 B1 * | 12/2009 | Baxter | ............. | H03K 19/01758 710/33 |
| 7,746,099 B1 * | 6/2010 | Chan | ................ | H03K 19/17756 326/38 |

(Continued)

OTHER PUBLICATIONS

Cong et al. High-Level Synthesis for FPGA: From Prototyping to Deployment IEEE Transactions on Computer-Aided Design of Integrated Circuits and Systems, vol. 30, No. 4, Apr. 2011.*

(Continued)

*Primary Examiner* — Omar Fernandez Rivas
*Assistant Examiner* — Cuong Luu
(74) *Attorney, Agent, or Firm* — LeRoy D. Maunu

(57) ABSTRACT

A method is provided for simulating a program executable by a processor and a circuit design configured to communicate with the processor. A processor on a programmable IC is configured to execute the program. Programmable resources on the programmable IC are configured to implement a plurality of interface circuits. Each of the interface circuits is configured to communicate data between the processor and a simulation environment using a respective communication protocol. The interface circuits that uses a communication protocol used by the circuit design is enabled and other ones of the interface circuits are disabled. The circuit design is simulated in a simulation environment coupled to the programmable IC. During the simulating, the program is executed on the processor and data is communicated between the processor and the computing platform using the determined one of the plurality of interface circuits.

20 Claims, 4 Drawing Sheets

(56) References Cited

U.S. PATENT DOCUMENTS

| | | | | |
|---|---|---|---|---|
| 7,852,109 | B1* | 12/2010 | Chan | G01R 31/31724 326/16 |
| 7,913,022 | B1* | 3/2011 | Baxter | G06F 13/1605 326/38 |
| 7,932,743 | B1* | 4/2011 | Stewart | H03K 19/17756 326/38 |
| 7,991,604 | B2* | 8/2011 | Lee | G06F 17/5009 703/13 |
| 8,015,537 | B1* | 9/2011 | Sundararajan | G06F 17/5054 716/100 |
| 8,042,079 | B1* | 10/2011 | Sundararajan | G06F 17/5054 712/225 |
| 9,026,874 | B2* | 5/2015 | Cheng | G01B 31/318563 714/729 |
| 9,053,327 | B2* | 6/2015 | Vandervort | G06F 21/60 |
| 2003/0100133 | A1* | 5/2003 | Eidson | G06F 11/3664 438/16 |
| 2004/0113655 | A1* | 6/2004 | Curd | G06F 15/7867 326/40 |
| 2004/0170070 | A1* | 9/2004 | Rapp | G06Q 40/08 365/200 |
| 2005/0021749 | A1* | 1/2005 | Donlin | H03K 19/17736 709/225 |
| 2005/0058187 | A1* | 3/2005 | Groen | H04L 25/14 375/219 |
| 2005/0256969 | A1* | 11/2005 | Yancey | G06F 13/4256 709/238 |
| 2007/0101242 | A1* | 5/2007 | Yancey | G06F 13/4256 714/776 |
| 2008/0040090 | A1* | 2/2008 | Lee | G06F 17/5009 703/14 |
| 2009/0213946 | A1* | 8/2009 | Dick | G06F 17/5054 375/260 |
| 2009/0216512 | A9* | 8/2009 | Lee | G06F 17/5009 703/14 |
| 2010/0142243 | A1* | 6/2010 | Baxter | G11C 5/04 365/51 |
| 2012/0150479 | A1* | 6/2012 | Balkan | G01R 31/31727 702/125 |
| 2013/0013107 | A1* | 1/2013 | Felique | G07F 9/006 700/244 |
| 2013/0156050 | A1* | 6/2013 | Hiraoka | G06F 13/4045 370/474 |
| 2014/0101506 | A1* | 4/2014 | Cheng | G01B 31/318563 714/729 |
| 2014/0145758 | A1* | 5/2014 | Atsatt | H03K 19/1731 326/41 |

OTHER PUBLICATIONS

Xilinx Xilinx AXI Reference Guide, Sep. 2010, pp. 1-82.*
U.S. Appl. No. 13/747,940, filed Jan. 23, 2013, Sundararajan et al.
Parekh, Umang, *Hardware in the Loop (HIL) Simulation for the Zynq-7000 All Programmable SoC*, XAPP744 (v1.0.2), Nov. 2, 2012, pp. 1-28, Xilinx, Inc., San Jose, California, USA.

* cited by examiner

SIMULATION OF SYSTEM DESIGNS

TECHNICAL FIELD

The disclosure generally relates to the development, simulation, and debugging of system designs.

BACKGROUND

Programmable integrated circuits (ICs) may be programmed by a user to perform specified logic functions. One type of programmable IC, known as a field programmable gate array (FPGA), typically includes programmable resources that are arranged in an array of programmable tiles including, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Programmable ICs provide flexible hardware solutions that are advantageous for high performance parallel computing in advanced digital communications and video applications. For many complex applications, it may be desirable to implement a portion of the design in software (a program design) and a portion of the design in programmable resources. Many manufacturers, such as Xilinx, Inc., include embedded processor systems in a number of programmable ICs. These embedded processor systems can meet both software and hardware programmable needs. Embedded processor systems often include operating memory, software instruction storage, input/output, and other components of a computer system. These systems are referred to as system on chip (SOC) solutions. In these systems, designers may implement complex functions in programmable logic to increase efficiency and throughput. This architectural combination gives an advantageous mix of serial and parallel processing, flexibility, and scalability, thereby enabling a more optimized system partitioning.

During the process of developing a system design to be implemented on a programmable IC, the behavior of the system design is simulated based on a specification of the circuit design. Simulating the system design helps to verify correct behavior prior to physical implementation and deployment. Wasted manufacturing costs due to faulty design may thereby be avoided. Numerous tools are available for simulating circuit designs including, for example, high-level modeling systems (HLMS).

An HLMS is a software tool in which circuit designs can be assembled using a graphical user interface, translated into a hardware description language (e.g., HDL and VHDL), simulated, and translated into executable simulation code or into a configuration data stream that can be used to configure programmable resources of a programmable IC.

For a system design that includes a circuit to be implemented in programmable resources of a programmable IC and a program to be executed on a processer of the programmable IC, the circuit design and programmed processor are co-simulated together to verify correct interoperation of the circuit and processor. Based on the behavior exhibited by the simulated system, further modification to the circuit design and/or program design may be required.

In some simulation configurations, rather than simulating the programmed processor in the HLMS, the program may be executed on the processor of the programmable IC during simulation of the circuit design in the HLMS. However, it can be difficult to communicate data signals output from the programmed processor to the HLMS and vice versa. For instance, an interface circuit is needed to provide data signals between the HLMS and the processor of the programmable IC during the simulation. The interface circuit is configured by a designer to communicate data signals to and from desired ports of the processor. The circuit design is also configured by the designer to map ports of the circuit design to correct ports of the interface circuit. Moreover, after simulation of the circuit design in the HLMS, the circuit design must be reconfigured by a designer to map ports of the circuit design directly to corresponding ports of the processor of the programmable IC. Configuration of an interface circuit and mapping of ports is a lengthy manual process, which may present a substantial barrier for a designer.

SUMMARY

A method is provided for simulating a system including a program executable by a processor and a circuit configured to communicate with the processor. A processor on a programmable IC is configured to execute the program. Programmable resources on the programmable IC are configured with a configuration data stream. The configuration data stream causes the programmable resources to implement a plurality of interface circuits. Each of the plurality of interface circuits is configured to use a respective communication protocol to communicate data between the processor and a simulation environment over a set of communication channels. One of the plurality of interface circuits that is configured to use a communication protocol used by the circuit of the system is determined. The determined one of the plurality of interface circuits is enabled, and other ones of the plurality of interface circuits are disabled. The circuit of the system is simulated using the simulation environment on a computing platform coupled to the programmable IC. During the simulating, the program is executed on the processor, and data is communicated between the processor and the computing platform using the determined one of the plurality of interface circuits.

A system is provided for co-simulation of a design including a program executable by a processor and a circuit configured to communicate with the processor. The system includes a programmable integrated circuit (IC) having a processor and programmable resources. The system also includes a computing platform coupled to the programmable IC. The computing platform is configured to program the processor on the programmable IC to execute the program of the design. The computing platform is configured to configure the programmable resources on the programmable IC with a configuration data stream. The configuration data stream causes the programmable resources to implement a plurality of interface circuits. Each of the plurality of interface circuits is configured to use a respective communication protocol to communicate data between the processor of the programmable IC and a simulation environment executed on the computing platform over a set of communication channels. The computing platform is further configured to enable one of the plurality of interface circuits, which is configured to use a communication protocol used by the circuit of the design, and disable other ones of the plurality of interface circuits. The computing platform is further configured to use the simulation environment to simulate the circuit of the design. During the simulation, the computing platform is configured to communicate data between the processor and the simulation environment using the enabled one of the plurality of interface circuits.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Figure 1:
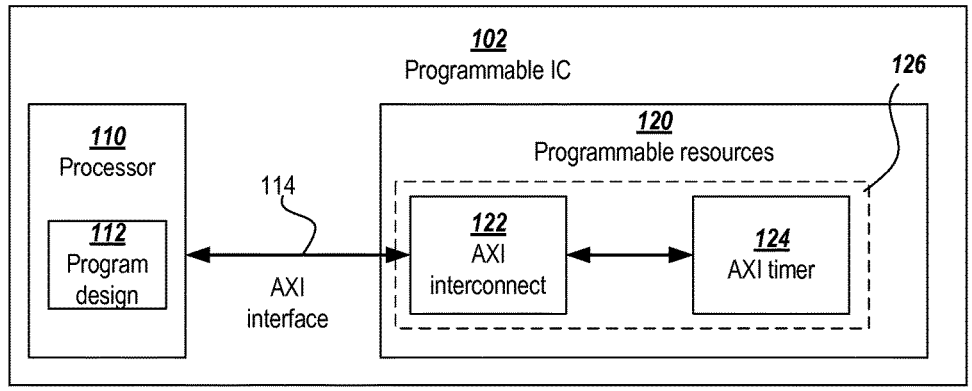
FIG. 1 shows a block diagram of a system including a program executed on a processor of a programmable IC and a circuit design implemented in programmable resources of the programmable IC.

Methods and circuits are disclosed for simulation of a system design that includes a circuit design portion to be implemented using programmable resources of a programmable IC, and a program design portion to be executed on a processor of the programmable IC. The program design and circuit design are co-simulated, using the processor of the programmable IC to execute and debug the program design and an HLMS implemented on a computing platform to simulate and debug the circuit design. An interface circuit implemented in programmable resources is configured to communicate data signals between the circuit design simulated in the HLMS and the program design executed on the processor.

Depending on the target programmable IC and application, data signals may be communicated between the programmed processor and the simulated circuit design using a number of communication protocols including, for example, AXI4-stream, AXI4-Lite, AXI4-MM, or PCIe. In some embodiments, a predesigned interface circuit may be used for co-simulation. The predesigned interface circuit includes a plurality of interconnect circuits for different protocols that may be used by various system designs. As multiple communication protocols are supported by the interface circuit, the interface circuit may be used to facilitate co-simulation of a larger number of different system designs. Use of a pre-developed interface circuit reduces time and manual configuration required by a developer for co-simulation of a system design.

In some implementations, such an interface circuit may be provided as a pre-developed configuration data stream (sometimes referred to as a "pre-canned bitstream") that may be used to configure programmable resources without requiring development and configuration of the interface by a developer.

In another implementation, the interface circuit may be provided to the HLMS as a pre-developed circuit design module (sometimes referred to as an "intellectual property (IP) core"). Prior to simulating the system design, the intellectual property core is synthesized, placed, routed, and converted into a configuration data stream that may be used to configure programmable resources of the programmable IC to implement the interface circuit. In some implementations, various parameters of the IP core may be adjusted by a developer prior to synthesis.

Depending on the implementation, data signals may be communicated between the interface circuit and the simulated circuit design in the HLMS using a number of different communication channels including, for example, JTAG, PCIe, and Ethernet. In some implementations, the communication channel is used to communicate information to facilitate debugging of either the program design or the circuit design. For example, debug breakpoints may be included in either the program design or the circuit design. This provides a versatile mechanism to debug hardware and software simultaneously at a system level. Breakpoints may be used to provide full visibility into the program, the processor's internal registers, and memory contents. In the circuit design simulation, breakpoints may be used to view any signal in HDL, e.g., in a waveform viewer GUI of an HLMS.

In some applications, data is communicated between the program design in the processor and the circuit design using a communication protocol that utilizes handshake signals. For instance, AXI interfaces utilize a ready/valid-based handshake mechanism to ensure that a transaction is completed successfully. In some embodiments, debugging information is communicated between the program design executing on the processor of the programmable IC and the circuit design simulated in the HLMS. For instance, when an instruction is executed on the processor to access the circuit design portion of the system, this instruction generates AXI signals which can be viewed within the HLMS. While the instruction in the processor waits for the ready/valid handshake to be completed, debugging of the circuit design HDL may be performed. In this manner, debugging of the program design and circuit design may be performed simultaneously.

Turning now to the figures, FIG. 1 shows a block diagram of a deployed system design including a program design 112 executing on a processor 110 of a programmable IC 102 and a circuit design 126, implemented in programmable resources 120 of the programmable IC 102. In this example, the processor is configured to communicate with the circuit design 126 in the programmable resources using a set of AXI channels 114. The circuit design 126 includes various logic circuits specified in the system design (not shown) and circuits to facilitate communication over the AXI channels 114. For instance, in this example, the circuit design 126 includes AXI interconnect 122 to communicate data between the deployed program design 112 and the circuit design. The circuit design 126 also includes an AXI timer circuit 124, which provides interrupt signals to coordinate communication over the AXI channels 114.

Figure 2:
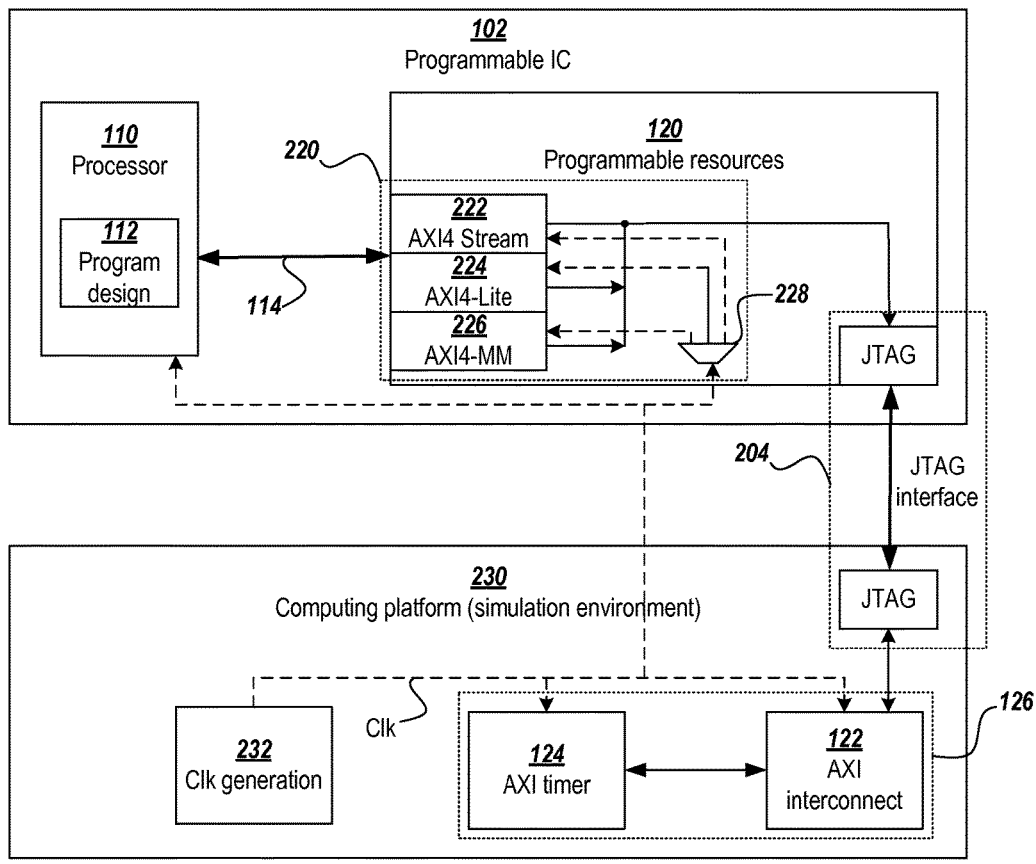
FIG. 2 shows a block diagram of a system configured for simulation of a circuit design of a system in a simulation environment using data provided by a processor included on a target programmable IC.

FIG. 2 shows a block diagram of one example system for co-simulation of the program design and circuit design shown in FIG. 1. During simulation, the AXI interconnect 122 and timer 124 components and the rest of the circuit design 126 are simulated in a simulation environment implemented on a computing platform 230, and the program design 112 is executed on the processor 110 of the programmable IC 102. To communicate signals between the processor and the computing platform 230 during simulation, programmable resources 120 are configured to implement an interface circuit 220 for AXI channel 114. In this example, the interface circuit includes three types of AXI interconnect circuits, AXI4-stream circuit 222, AXI4-Lite circuit 224, and AXI4-MM circuit 226. Each of the interface circuits 222, 224, and 226 is configured to communicate data signals between the program design executing on the processor 110 and the circuit design (e.g., 122 and 124) being simulated on the computing platform 230 over a communication channel (e.g., JTAG interface 204).

Prior to simulation, an interconnect circuit of the interface circuit 220 using the same protocol as the user design is selected to communicate the data signals. For instance, in one implementation, the interconnect circuit of the interface 220 to be used for simulation is selected by a user. In another embodiment, the computing platform 230 is configured to determine and select one of the interconnect circuits that uses the same communication protocol as the circuit design (e.g., based on metadata included with the interface circuit 220 and circuit design 126).

The selected interconnect circuit is enabled and other interconnect circuits of the interface circuit 220 are disabled. For instance, if AXI interconnect 122 of the simulated circuit design implements the AXI4-stream protocol, the AXI4-stream interconnect 222 of the interface circuit 220 is enabled and AXI4-MM and AXI4-Lite interconnects are disabled. In this example, the selected interconnect is enabled and other interconnects are disabled by providing a clock signal (01k) to only the selected interconnect using demultiplexer 228. Control signals for the demultiplexer 228 that indicate the selected interconnect circuit may be provided statically from a memory cell on the programmable IC or dynamically from the computing platform 230 during simulation. However, other logic may be used to enable and disable interconnect circuits 222, 224, or 226 of the interface circuit 220.

The AXI-based interfaces are clocked using a single stepped clock (01k), which is generated by a clock generation circuit 232 on the computing platform 230. This allows cycle accurate operation of the IP's in the simulation. However, in some embodiments, different AXI interfaces (110 and 122) may be clocked with different clocks. For instance, the processor 110 and memory (not shown) may be clocked by an independent clock generated by a hardware platform (not shown) to which the programmable IC is connected.

The ready/valid based handshake mechanism of the AXI protocol may be used to coordinate simultaneous debugging of the program and the circuit design. When an instruction is executed on the processor to access the circuit design portion of the system, an AXI signal is sent to the simulation environment. While the instruction being executed on the processor 110 is waiting for the ready/valid handshake to be completed, the simulation environment implemented on computing platform 230 may perform debugging of the circuit design HDL without the program design 112 advancing to the next point in time of the simulation. Conversely, when events that correspond to the processor are encountered in the simulation environment, an AXI signal is sent from the simulation environment to the processor on the programmable IC. While the simulation environment is waiting for the ready/valid handshake to be completed, debugging code (e.g., triggered by a breakpoint) may be executed on the processor without the simulation environment advancing to the next point in time of the simulation.

Figure 3:
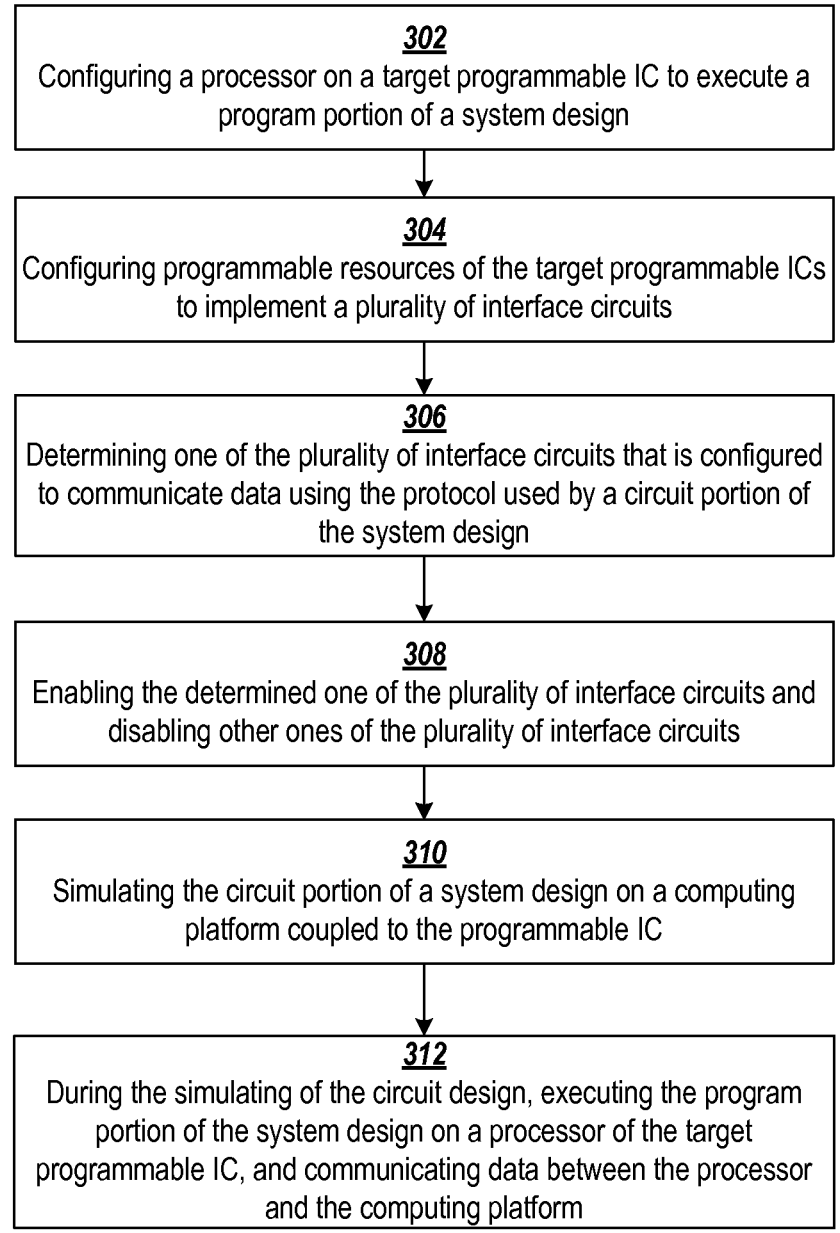
FIG. 3 shows a flowchart of a method for simulation of a system.

FIG. 3 shows a flowchart of a method for simulation of a system. A processor on a target programmable IC is configured to execute a program portion of a system design at block 302. Programmable resources of the target programmable ICs are configured to implement a plurality of interface circuits at block 304. Block 306 determines one of the plurality of interface circuits that is configured to communicate data using the protocol used by a circuit portion of the system design. At block 308, the determined one of the plurality of interface circuits is enabled and other ones of the plurality of interface circuits are disabled. The circuit portion of a system design is simulated on a computing platform coupled to the programmable IC at block 310. During the simulating of the circuit design, at block 312, the program portion of the system design is executed on a processor of the target programmable IC, and data is communicated between the processor and the computing platform.

Figure 4:
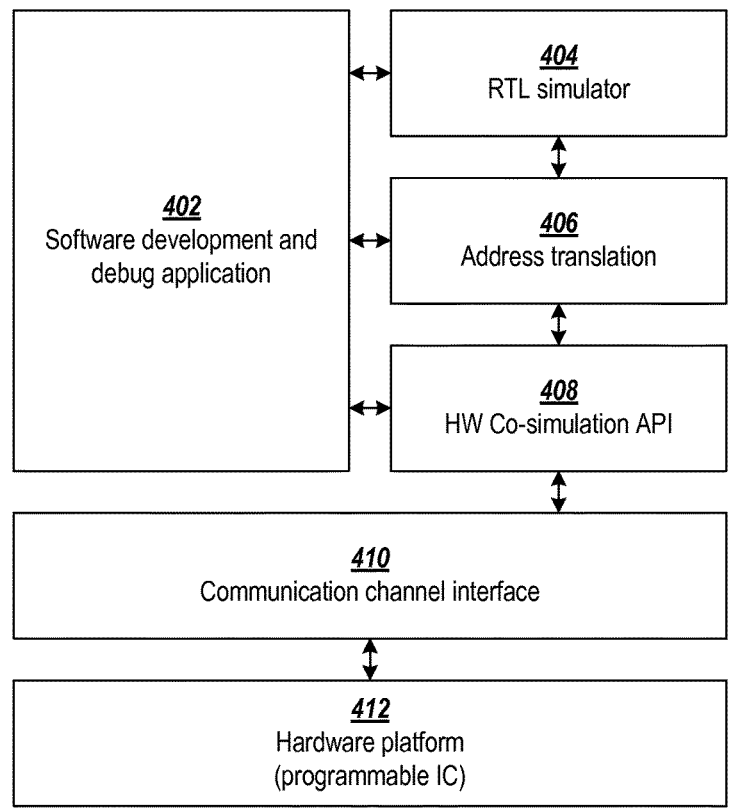
FIG. 4 shows an example protocol hierarchy of a system for simulation.

FIG. 4 shows a system for simulation. The system includes a software development and debug application 402 (e.g., HLMS) implemented on a computing platform, a hardware platform 412 (e.g., a programmable IC) on which the program design is executed, and a communication channel interface 410 for communication of data between the application 402 and the hardware platform 412. The software development and debug application 402 is used to develop and debug the program design software to be executed on the processor of the programmable IC and the circuit design to be deployed in programmable resources of the programmable IC. The software development and debug application 402 utilizes a register transfer level (RTL) simulator 404, an address translation layer 406, and a hardware co-simulation application program interface (API) layer 408.

During the simulation of a user system design, the user indicates the circuit design to be implemented using programmable resources of a programmable IC and indicates a program design portion to be executed on the processor of the programmable IC. The circuit design portion of the system design is simulated by the RTL simulator 404, while the program design is simulated by executing the program on a processor of the programmable IC 412. During simulation, for any events that correspond to the processor, the HW co-simulation API 408 is called by the RTL simulator 404, to communicate the event information to the programmable IC 412.

Data signals for both simulation and debugging may be communicated between the programmable IC and the simulator using the same communication channel interface 410. In the example shown in FIG. 2, the communication channel is implemented using the JTAG protocol. However, in some implementations, the communication channel interface may utilize other protocols (e.g., PCIe, and Ethernet).

In some embodiments, only a subset of ports of a programmable IC are used to communicate simulation and debugging data signals between the processor and the simulation environment. For example, in one implementation, the address translation layer 406 is configured to map ports of a simulated circuit design that communicate with the processor design to the communication channel interface 410. Data provided from other ports of the simulated circuit design may be discarded by the address translation layer 406. Using this approach, the RTL simulator 404 may perform simulation as though ports of the simulated circuit design are directly mapped to the corresponding ports of the programmable IC.

Figure 5:
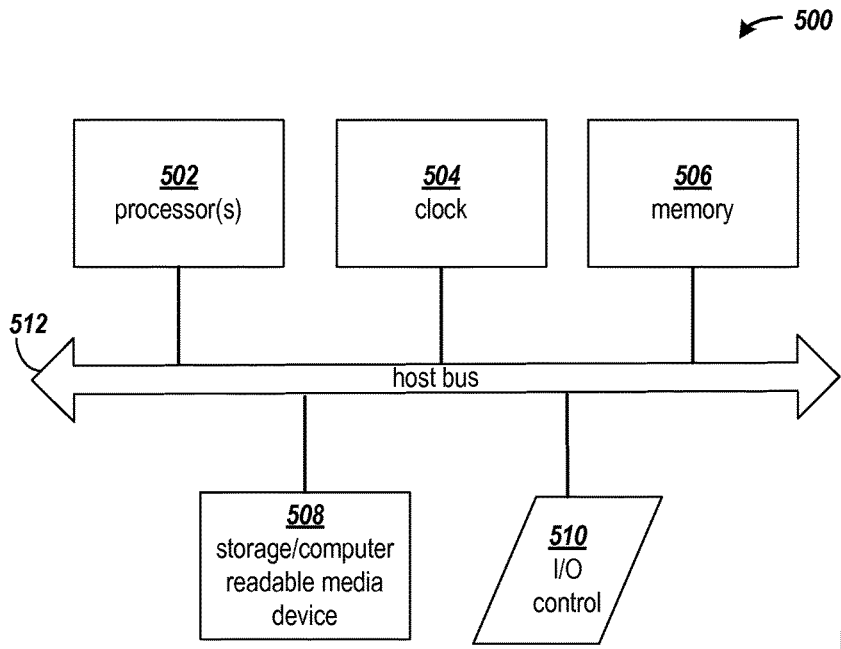
FIG. 5 shows a computing arrangement that may be used to perform one or more of the processes disclosed herein.

FIG. 5 shows a block diagram of an example computing arrangement that may be configured to implement the co-simulation processes of the computing platform described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 500 includes one or more processors 502, a clock signal generator 504, a memory arrangement 506, a storage arrangement 508, and an input/output control unit 510, all coupled to a host bus 512. The arrangement 500 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 502 may be one or more general-purpose processors, or a combination of one or more general-purpose processors and suitable co-processors, or one or more specialized processors (e.g., RISC, CISC, pipelined.).

The memory arrangement 506 typically includes multiple levels of cache memory, and a main memory. The storage arrangement 508 may include local and/or remote persistent storage, such as provided by magnetic disks (not shown), flash, EPROM, or other non-volatile data storage. The storage unit may be read or read/write capable. Further, the memory arrangement 506 and storage arrangement 508 may be combined in a single arrangement.

The processor(s) 502 executes the software in storage arrangement 508 and/or memory arrangement 506, reads data from and stores data to the storage arrangement 508 and/or memory arrangement 506, and communicates with external devices through the input/output control arrangement 510. These functions are synchronized by the clock signal generator 504. The resource of the computing arrangement may be managed by either an operating system (not shown), or a hardware control unit (not shown).

Those skilled in the art will appreciate that various alternative computing arrangements, including one or more processors and a memory arrangement configured with program code, would be suitable for hosting the processes and data structures of the different disclosed embodiments.

Figure 6:
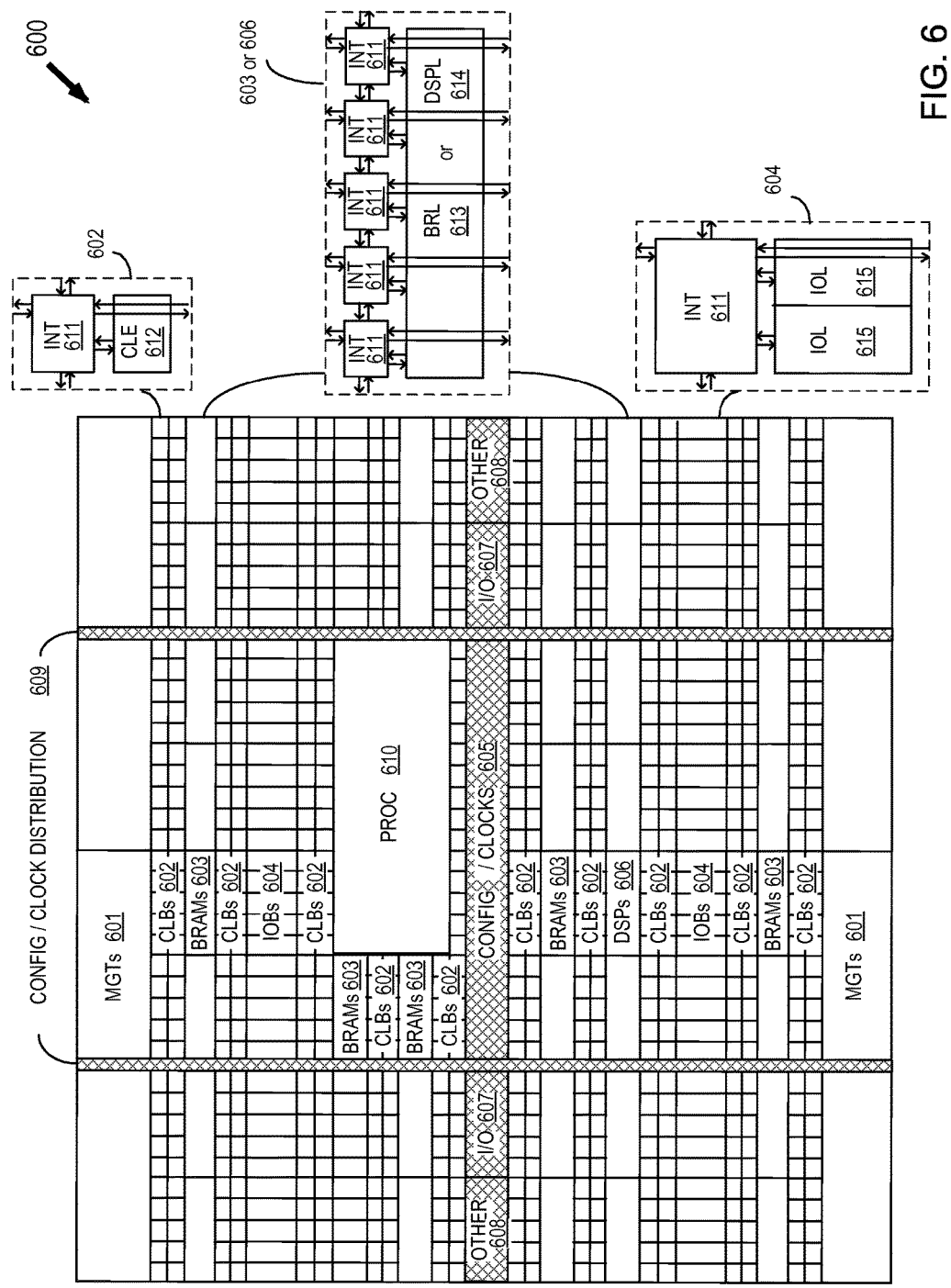
FIG. 6 shows an example programmable IC that may be configured in accordance with the systems and method described herein.

FIG. 6 is a block diagram of an example programmable logic integrated circuit that may be used in implementing a system design in accordance with various implementations. The programmable IC shown in FIG. 6 is an FPGA. FPGAs can include several different types of programmable logic blocks in the array. For example, FIG. 6 illustrates an FPGA architecture (600) that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), for example, e.g., clock ports, and other programmable logic 608 such as digital clock managers, analog-to-digital converters, system monitoring logic, and so forth. Some FPGAs also include dedicated processor blocks (PROC 610) and internal and external reconfiguration ports (not shown).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 6.

For example, a CLB 602 can include a configurable logic element (CLE 612) that can be programmed to implement user logic plus a single programmable interconnect element INT 611. A BRAM 603 can include a BRAM logic element (BRL 613) in addition to one or more programmable interconnect elements. Typically, the number of interconnect elements included in a tile depends on the width of the tile. In the pictured FPGA, a BRAM tile has the same width as five CLBs, but other numbers (e.g., four) can also be used. A DSP tile 606 can include a DSP logic element (DSPL 614) in addition to an appropriate number of programmable interconnect elements. An 10B 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured FPGA, a horizontal area near the center of the die (shown shaded in FIG. 6) is used for configuration, clock, and other control logic. Vertical areas 609 extending from this horizontal area are used to distribute the clocks and configuration signals across the breadth of the FPGA.

Some FPGAs utilizing the architecture illustrated in FIG. 6 include additional logic blocks that disrupt the regular row structure making up a large part of the FPGA. The additional logic blocks can be programmable blocks and/or dedicated logic. For example, the processor block PROC 610 shown in FIG. 6 spans several rows of CLBs and BRAMs.

Note that FIG. 6 is intended to illustrate only an exemplary FPGA architecture. The numbers of logic blocks in a row, the relative heights of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic.

The described examples are thought to be applicable to a variety of systems for co-simulation and debugging. Other aspects will be apparent to those skilled in the art from consideration of the specification. For instance, although the examples may in some cases be shown in individual figures, it will be appreciated that features from one figure can be combined with features of another figure, even though the combination is not explicitly shown or explicitly described as a combination. The systems may be implemented as one or more processors configured to execute software, as an application specific integrated circuit (ASIC), or as a logic on a programmable logic device, for example. It is intended that the specification and figures be considered as examples only, with a true scope of the invention being indicated by the following claims.

What is claimed is:

1. A method for simulating operation of a system design including a program executable by a processor on a programmable IC and a circuit implemented by programmable resources on the programmable IC, the circuit being configured to communicate with the program executing on the processor via an interface circuit that uses a first communication protocol, the method comprising:
configuring a processor on the programmable IC to execute the program;
configuring programmable resources on the programmable IC with a configuration data stream;
wherein the configuration data stream is configured to implement a plurality of alternative interface circuits together using the programmable resources;
wherein each of the plurality of alternative interface circuits is configured to use a respective communication protocol to communicate data between the processor and a simulation environment over a set of communication channels, and the plurality of alternative interface circuits includes an interface circuit that uses the first communication protocol;
determining and selecting by the simulation environment, one of the plurality of alternative interface circuits that is configured to use the first communication protocol based on metadata included with the plurality of alternative interface circuits and the system design;
enabling the determined one of the plurality of alternative interface circuits and disabling other ones of the plurality of alternative interface circuits after configuring the programmable IC with the configuration data stream;
simulating the circuit of the system design using the simulation environment on a computing platform coupled to the programmable IC; and
during the simulating, executing the program on the processor and communicating data between the processor and the computing platform via the determined one of the plurality of alternative interface circuits.

2. The method of claim 1, further comprising:
during the simulating, providing a first clock signal from the computing platform to the programmable IC;
wherein the enabling of the determined one of the plurality of alternative interface circuits includes:
providing the first clock signal to the determined one of the plurality of alternative interface circuits; and
preventing the first clock signal from being provided to the other ones of the plurality of alternative interface circuits.

3. The method of claim 2, further comprising:
providing a second clock signal from a hardware platform coupled to the programmable IC to the processor on the programmable IC, the first clock signal being unsynchronized from the second clock signal.

4. The method of claim 1, wherein the communicating of the data between the computing platform and the programmable IC is performed over a communication channel utilizing a handshaking protocol.

5. The method of claim 4, wherein:
the program includes one or more debug breakpoints; and
the processor is configured to, in response to executing an instruction of the program that accesses the circuit of the system design simulated using the simulation environment circuit:
communicate a transaction request message to a timer of the computing platform via the handshaking protocol; and
halt execution of the program until a message indicating the requested transaction has completed is received from the computing platform.

6. The method of claim 1, further comprising:
during the simulating, communicating the data between the computing platform and the programmable IC over a high bit-rate communication channel.

7. The method of claim 1, further comprising:
retrieving the configuration data stream from a database.

8. The method of claim 1, further comprising:
compiling a circuit design specified in an IP-core to generate the configuration data stream.

9. The method of claim 1, further comprising:
debugging the program executing on the processor during simulation using one or more debug breakpoints in the program.

10. The method of claim 1, further comprising:
debugging the circuit of the system design simulated in the simulation environment using one or more debug breakpoints in the simulation of the circuit.

11. The method of claim 1, wherein:
the programmable IC includes a plurality of communication ports;
the communicating of the data between the programmable IC communicates data between a subset of the plurality of communication ports; and
the simulation environment includes an address translation module configured to perform address translation between ports of the simulated circuit and ports of the programmable IC.

12. The method of claim 11, wherein the address translation module is configured to:
communicate data output from ports of the simulated circuit, which correspond to the subset of the plurality of communication ports; and
discard data output from ports of the simulated circuit, which correspond to communication ports of the programmable IC that are not included in the subset of the plurality of communication ports.

13. A system for co-simulation of a design including a program executable by a processor and a circuit configured to communicate with the processor via an interface circuit that uses a first communication protocol, comprising:
a programmable integrated circuit (IC) including a processor and programmable resources; and
a computing platform coupled to the programmable IC;
wherein the computing platform is configured to:
configure the processor on the programmable IC to execute the program of the design;
configure the programmable resources on the programmable IC with a configuration data stream;
wherein the configuration data stream is configured to implement a plurality of alternative interface circuits together using the programmable resources;
wherein each of the plurality of alternative interface circuits is configured to use a respective communication protocol to communicate data between the processor of the programmable IC and a simulation environment executed on the computing platform over a set of communication channels, and the plurality of alternative interface circuits includes an interface circuit that uses the first protocol;
determine and select by the simulation environment, one of the plurality of alternative interface circuits that is configured to use the first communication protocol based on metadata included with the plurality of alternative interface circuits and the design;

enable the determined one of the plurality of alternative interface circuits and disable other ones of the plurality of alternative interface circuits after configuring the programmable IC with the configuration data stream; and using the simulation environment, simulate the circuit of the design, and during the simulation, communicate data between the processor and the simulation environment using the determined one of the plurality of alternative interface circuits.

14. The system of claim 13, wherein the computing platform is further configured to:

provide a first clock signal to the programmable IC during the simulation of the circuit of the design; and enable the determined one of the plurality of alternative interface circuits by providing the first clock signal to the determined one of the plurality of alternative interface circuits and preventing the first clock signal from being provided to the other ones of the plurality of alternative interface circuits.

15. The system of claim 13, wherein the simulation environment and the programmable IC are configured to communicate simulation and debugging data signals between the computing platform and the programmable IC over a communication channel utilizing a handshaking protocol.

16. The system of claim 15, wherein:

the programmable IC includes a plurality of communication ports;

the simulation environment and the programmable IC are configured to communicate simulation and debugging data signals using only a subset of the plurality of communication ports; and the simulation environment includes an address translation module configured to perform address translation between ports of the simulated circuit of the design and ports of the programmable IC.

17. The system of claim 16, wherein the address translation module is configured to:

communicate data output from ports of the simulated circuit of the design, which correspond to the subset of the plurality of communication ports; and discard data output from ports of the simulated circuit of the design that correspond to communication ports of the programmable IC not included in the subset of the plurality of communication ports.

18. The system of claim 13, wherein the computing platform is further configured to retrieve the configuration data stream from a database of configuration data streams.

19. The system of claim 13, wherein the computing platform is further configured to:

retrieve an IP-core from database of IP-cores; and generate the configuration data stream from the retrieved IP-core.

20. The system of claim 13, wherein the computing platform is further configured to debug the circuit of the design during the simulation using one or more one or more debug breakpoints in the simulation of the circuit.

* * * * *